United States Patent
Hrinya

(10) Patent No.: US 6,259,670 B1
(45) Date of Patent: Jul. 10, 2001

(54) MAGNETO-OPTICAL PREAMPLIFIER

(75) Inventor: Stephen J. Hrinya, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/160,466

(22) Filed: Sep. 24, 1998

Related U.S. Application Data

(60) Provisional application No. 60/092,863, filed on Jul. 17, 1998.

(51) Int. Cl.[7] ............................................. G11B 7/00
(52) U.S. Cl. ............................... 369/124.1; 369/124.12
(58) Field of Search .......................... 369/124.1, 124.12, 369/44.35, 44.36, 110, 13, 124.14, 124.15, 124.11

(56) References Cited

U.S. PATENT DOCUMENTS

| | | | |
|---|---|---|---|
| 5,254,957 | 10/1993 | Lauffenburger | 330/308 |
| 5,432,474 | 7/1995 | Lauffenburger et al. | 330/252 |
| 5,442,618 | 8/1995 | Dewey et al. | 369/124 |
| 5,459,706 | * 10/1995 | Ogawa et al. | 369/124.12 |
| 5,631,891 | * 5/1997 | Moritsugu et al. | 369/124.11 |
| 5,699,343 | * 12/1997 | Moritsugu et al. | 369/124.14 |
| 5,748,593 | * 5/1998 | Tanaka et al. | 369/124.15 |
| 5,805,536 | * 9/1998 | Gage et al. | 369/124.12 |

FOREIGN PATENT DOCUMENTS

WO9809392  3/1998  (WO).

* cited by examiner

*Primary Examiner*—Thang V. Tran
(74) *Attorney, Agent, or Firm*—Simon & Koerner LLP; Nancy R. Simon

(57) ABSTRACT

In a magneto-optical storage device, a digitally adjustable preamplifier stage balances polarization signal levels through use of a digital compensation value. A separate digital compensation value is stored for the signals corresponding to each detector head. Each time a different detector head is activated, the digital compensation value for the polarization signals corresponding to that head is accessed. The accessed digital compensation value is input to a digital to analog converter (DAC), which produces a voltage for setting the gain of the adjustable amplifier.

24 Claims, 6 Drawing Sheets

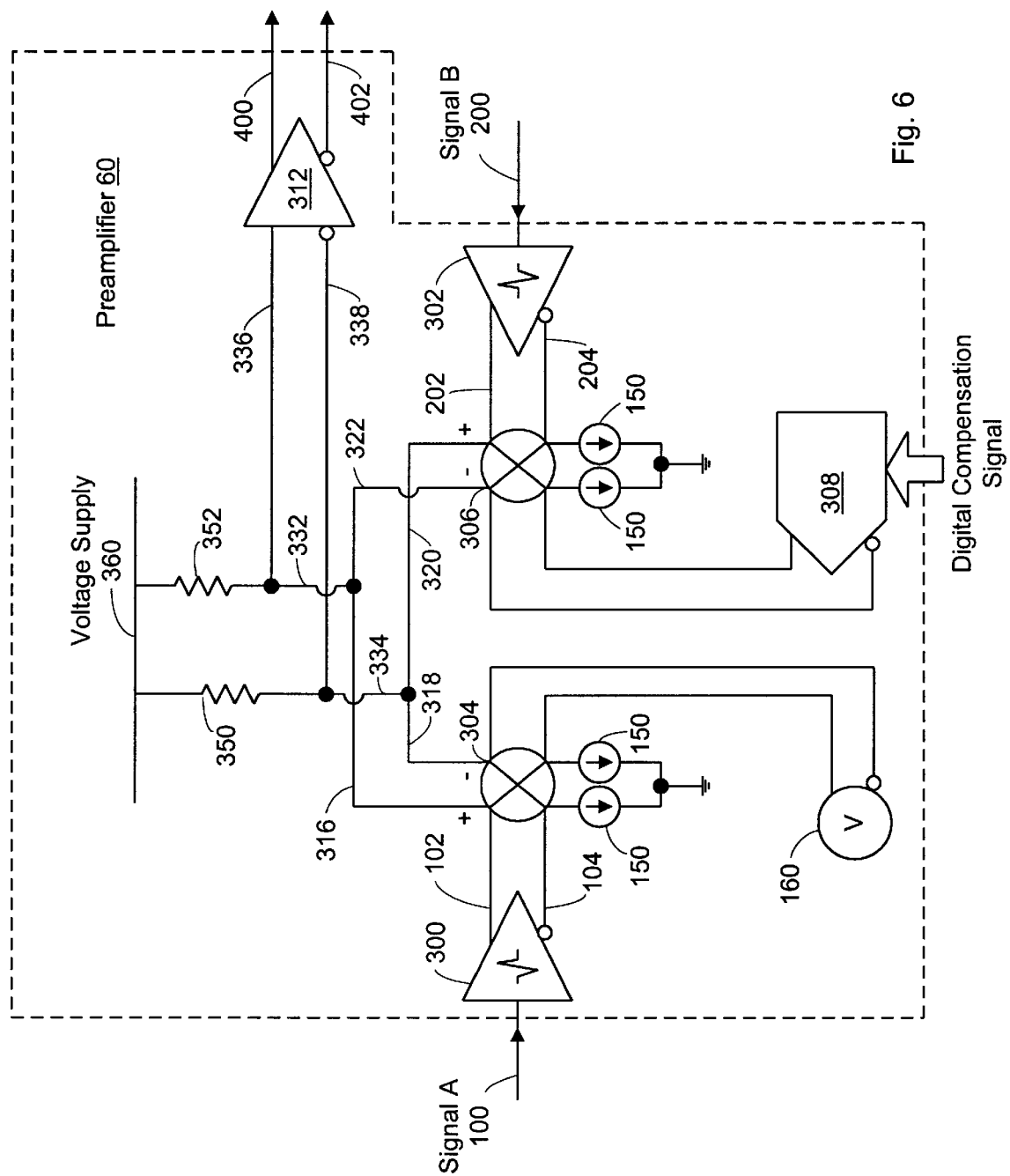

MAGNETO-OPTICAL PREAMPLIFIER

This application hereby claims the benefit of commonly assigned provisional application with serial No. 60/092,863, titled "Magneto-Optical Preamplifier", which was filed on Jul. 17, 1998.

FIELD OF INVENTION

This invention pertains to the field of magneto-optical storage technology. More specifically, this invention pertains to a preamplifier which compensates for imbalances in the optical and electrical paths of separate data signals.

BACKGROUND OF THE INVENTION

Information stored at a point on a magneto-optical storage surface is generally detected by analyzing the polarization of a beam of light that has been reflected off the point on the surface. A detector head receives the reflected light beam for analysis. The angle of polarization of the light beam rotates upon reflection in a manner that is dependent upon the magnetic field present at the point of reflection on the storage surface. Information is stored on the surface in the form of magnetic fields oriented in different directions. Differences in the resulting angle of polarization following reflection indicate the state of information stored on the surface at the point of reflection, since the direction of angular rotation of the polarity is determined by the direction of the magnetic field. The magnitude of the angular differences corresponding to different magnetic fields is typically small, on the order of plus or minus half a degree. Variations in the amplitude of the reflected light beam, however, are often as large as plus or minus ten percent of the total magnitude. Given the relatively large amount of amplitude fluctuation, accurate detection of polarization angles is generally difficult.

One way to determine variations in polarization angle is to split the reflected light beam into two orthogonally polarized component light beams, A and B. This can be done with a polarizing beam splitter. The beam splitter is oriented at a 45° angle from the polarization angle of the incoming beam. In the absence of any rotation of polarization, the A and B component light beams are of equal magnitude. With the beam splitter oriented this way, any rotation of the polarization angle results in one component having a larger magnitude than the other. The direction of the polarization angle rotation determines which of the components has the larger magnitude.

The A and B components can be detected by separate photodetectors, each generating electrical signals based on the magnitude of either the A or B polarization component of the reflected light beam. The direction of angular rotation, and consequently the direction of the magnetic field at a reflection point on the surface, can be determined by subtracting the A and B components, with the desired information appearing in the sign of the difference signal. Fluctuations in amplitude, which should appear equally in both the A and B components, should not affect the sign of the result of the subtraction. This is known as common mode rejection.

In reality, because the A and B components follow different paths from the beam splitter to the module which implements the differencing, and these paths have slightly different optical and electrical properties, the A and B components each undergo a slightly different variation. These unequal variations can introduce a bias into the difference signal, so that the result of differencing the signals is inaccurate. Because the polarization angle rotations to be detected are very small, even slight inaccuracies introduced from the paths of the signals can result in the polarization angle information being masked by the errors, making it difficult or impossible to extract the desired information.

In order to minimize the inaccuracies in the difference signal, compensation of either the A or B signal is necessary to account for the optical and electrical path differences. This is conventionally done by varying a potentiometer setting which adjusts a gain for one or both signals. The potentiometer is set so that, when no polarization angle rotation is present in the reflected light beam, the result of the differencing operation is as close to zero as possible.

Such a solution to the problem of individual path variation is generally not sufficient where a magneto-optical drive uses multiple detector heads with the differencing of signals being performed in a single module. A magneto-optical storage device can use more than one detector head to accommodate multiple storage surfaces. Because the paths for the A and B components corresponding to each detector head are different, a separate gain adjustment is necessary for each detector head. It would be impractical, however, to adjust a potentiometer on the differencing module each time a different detector head is selected. What is needed for such a magneto-optical storage device is a mechanism for automatically compensating for the individual path variations.

SUMMARY OF THE INVENTION

The present invention solves this problem through the use of a digitally adjustable preamplifier stage. Balancing of the A and B signals is performed by at least one amplifier with a gain that is adjustable through a digital compensation value. In one embodiment, a digital compensation value is stored for the A and B signals corresponding to each detector head. Each time a different detector head is activated, the digital compensation value for the A and B signals corresponding to that head is accessed. The accessed digital compensation value is input to a digital to analog converter (DAC), which produces a voltage for setting the gain of the adjustable amplifier. The compensation required for the signals from each detector head is applied when that detector head is activated.

BRIEF DESCRIPTION OF THE DRAWINGS

FIG. 6 is an illustration of one embodiment of a preamplifier according to the present invention.

DETAILED DESCRIPTION OF THE PREFERRED EMBODIMENTS

Figure 1:
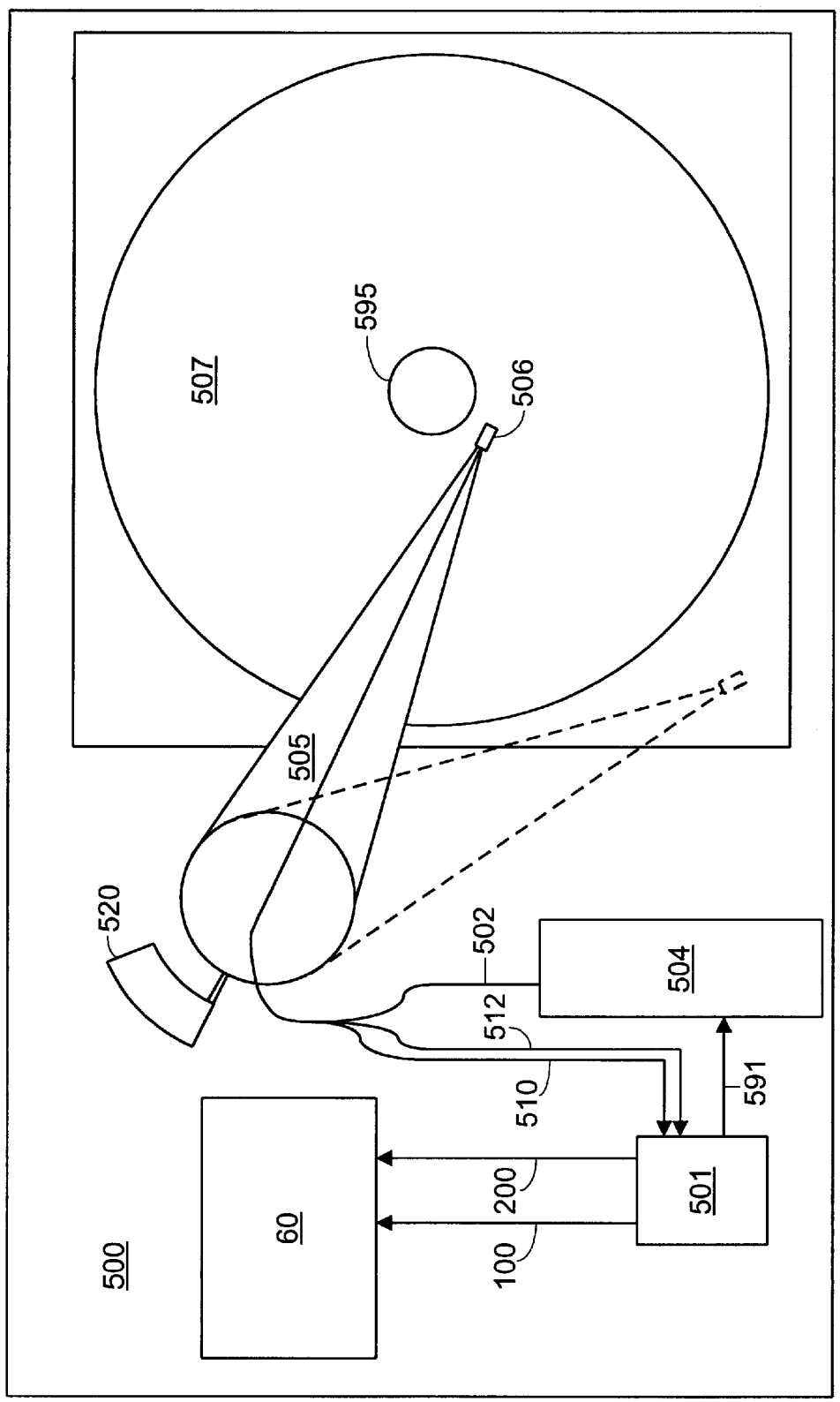
FIG. 1 is an illustration of a magneto optical storage device.

Referring now to FIG. 1, a magneto optical (MO) data storage system 500 employing multiple Winchester-type flying detector heads 506 is shown (only one detector head 506 is shown). MO storage system 500 includes a set of double-sided MO disks 507 (only one disk is shown). Each detector head 506 is coupled to a rotary actuator magnet and coil assembly 520 by an actuator arm 505, which positions detector head 506 over the surface of MO disk 507. In operation, MO disks 507 are rotated by spindle motor 595, which rotation generates aerodynamic lift forces between detector head 506 and MO disk 507. The lift forces are opposed by equal and opposite spring forces applied by actuator arm 505. Detector heads 506 are each maintained between a minimum and maximum flying height over the surface of MO disk 507 over a full radial stroke of actuator arm 505, thus preventing contact between detector head 506 and MO disk 507. At rest, detector heads 506 are maintained statically in a storage condition away from the surfaces of MO disk 507.

Figure 2:
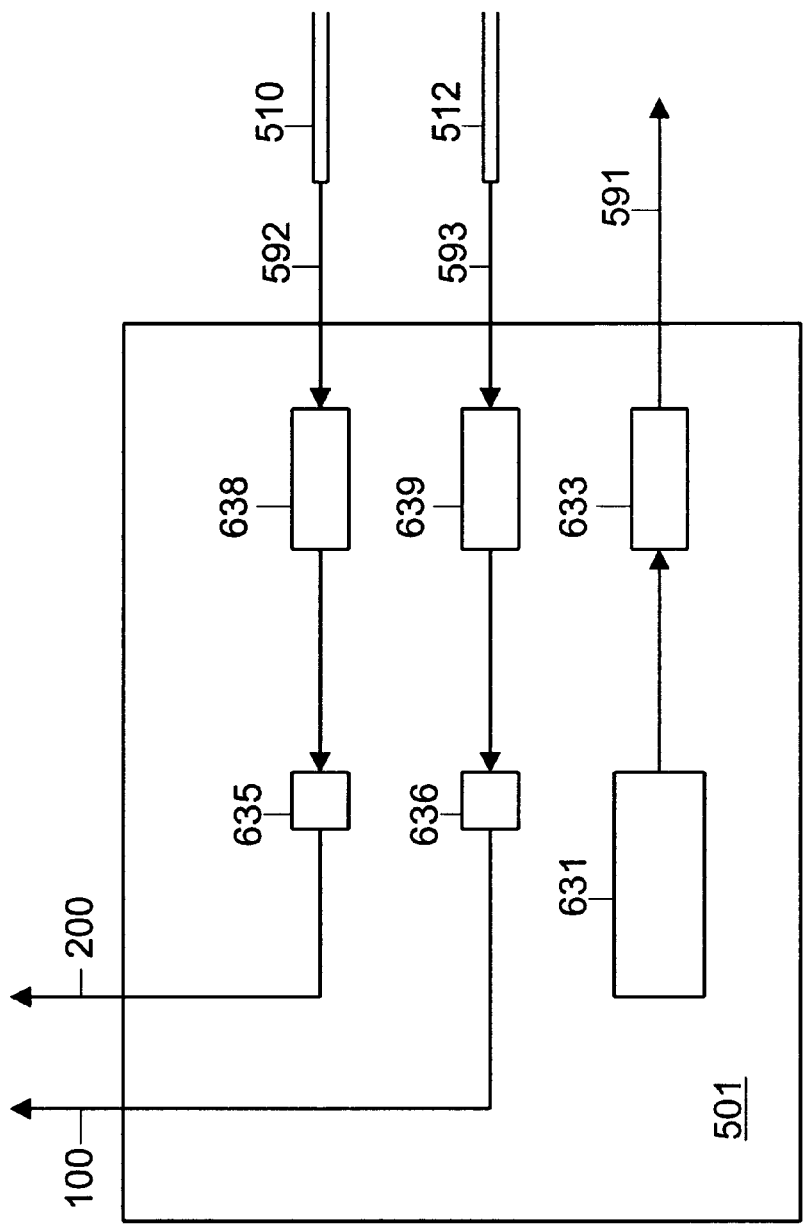
FIG. 2 is an illustration an optics assembly for a magneto optical storage device.

MO storage system 500 further includes laser optics assembly 501 optically coupled to optical switch 504. As shown in FIGS. 1 and 2, laser optics assembly 501 generates linearly-polarized laser beam 591 from Fabry-Perot (FP) diode laser source 631, through lens 633. Assembly 501 also receives reflected laser beam signals 592 and 593 with rotated tracking and phase information from return optical fibers 510 and 512. There is one set of fibers 510 and 512 for each detector head 506. A set of single-mode polarization maintaining optical fibers 502 optically couple optical switch 504 to each detector head 506.

Laser optics assembly 501 also includes coupling lenses 638 and 639, and photodiodes 635 and 636. Signal-intensity reflected laser beams 592 and 593 from each detector head 506 are coupled through respective return optical fibers 510 and 512 to the photodiodes 635 and 636, which operate as intensity-sensitive detectors. The present invention is not limited to the aforementioned arrangement of optical elements, as other techniques for directing incident laser beam 591 and for detecting the intensity of reflected laser beams 592 and 593 are well known.

Figure 3:
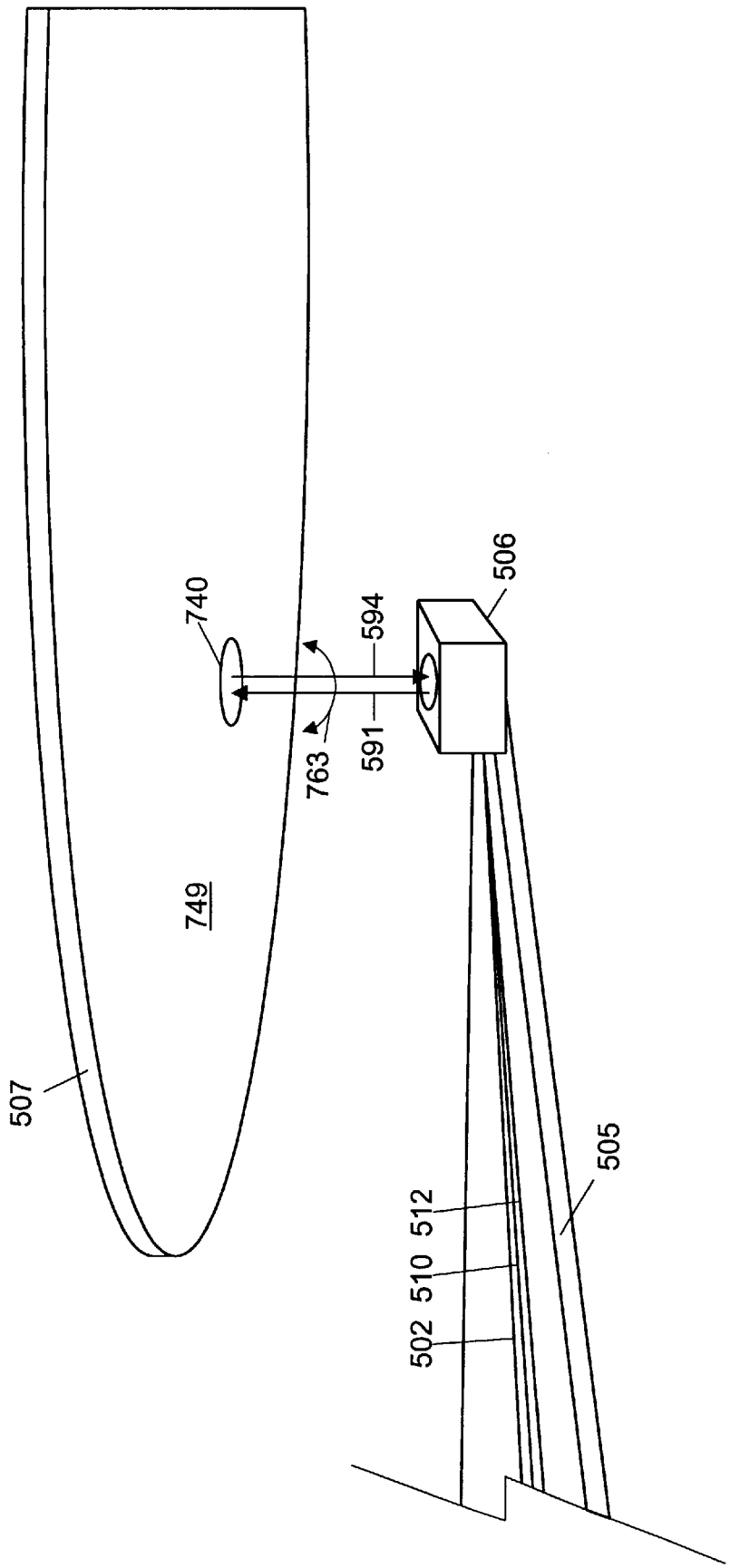
FIG. 3 is an illustration of a magneto optical detector head.

In FIG. 1, a representative optical path between detector head 506 and laser optics assembly 501 is illustrated. The optical path includes optical switch 504 and single-mode optical fiber 502. Optical switch 504 selectively couples incident laser beam 591 to a selected one of the single-mode optical fibers 502. Incident laser beam 591 is directed by single-mode optical fiber 502 to detector head 506, where it is reflected onto surface recording layer 749 of MO disk 507, as illustrated in FIG. 3. During recording, incident laser beam 591 is selectively routed to one side of one of the MO disks 507 and focused to one of many optical spots 740 on MO recording layer 749. Incident laser beam 591 heats spot 740 to approximately the Curie point, thus lowering its coercivity. The optical intensity of incident laser beam 591 is preferably held constant, while a time varying vertical-bias magnetic field is used to define a pattern of "up" and "down" magnetic domains perpendicular to the surface of layer 749. This technique is known as magnetic field modulation (MFM). Subsequently, as spot 740 cools, the information is encoded on layer 749.

During readout, incident laser beam 591, which is at a lower intensity than during recording, is selectively routed to one of the MO disks 507, reflecting off one of the spots 740. The Kerr effect causes reflected laser beam 594 from layer 749 to have rotated polarization 763 of either clockwise or counter-clockwise sense, depending on the magnetic domain polarity of spot 740.

Figure 4:
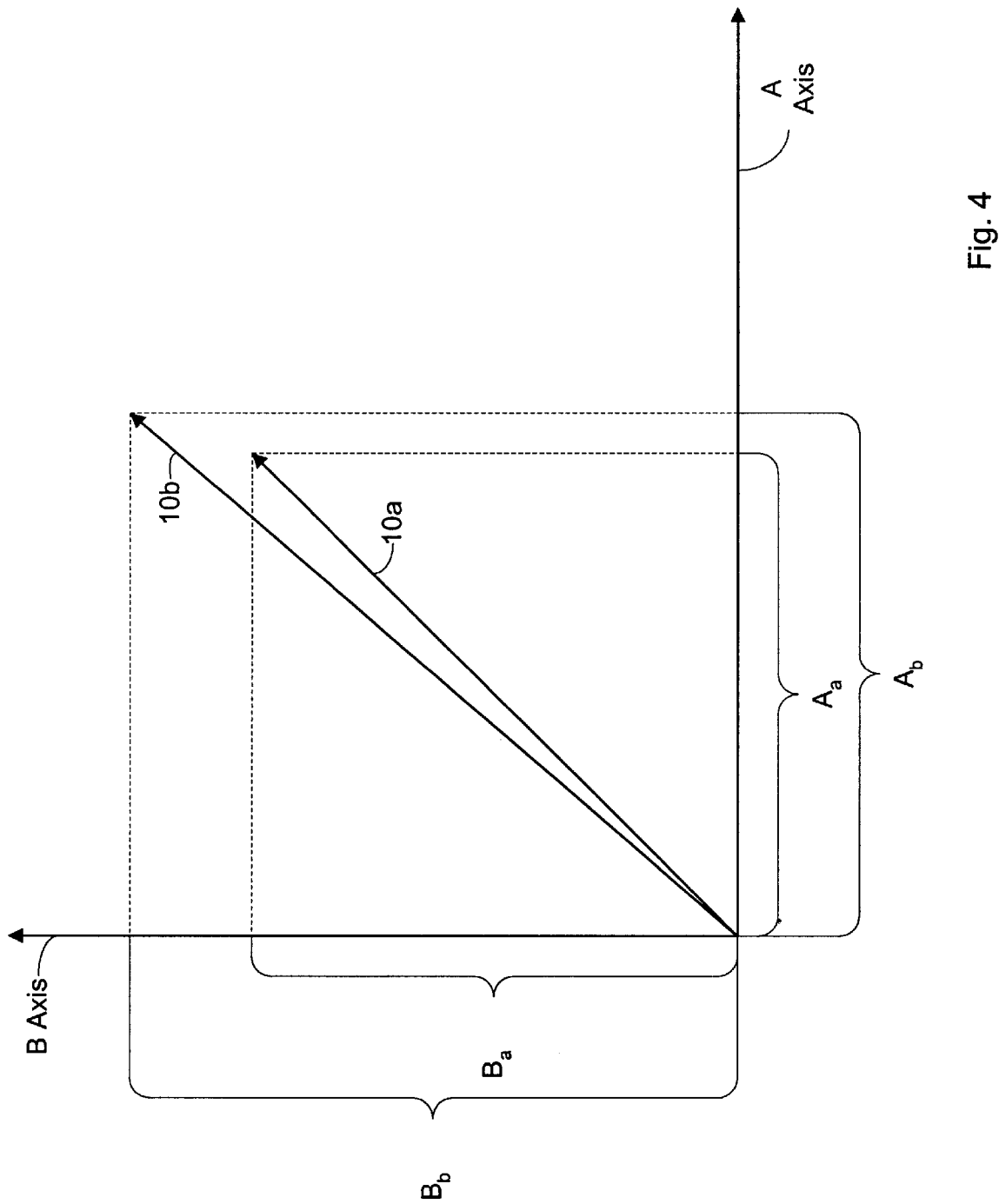
FIG. 4 is an illustration of the A and B polarization components resulting from two polarized light beams.

Referring now to FIG. 4, a polarization vector 10a is illustrated. Vector 10a corresponds to the polarization angle of a light beam that has been reflected off magneto-optical storage surface 749 and which has reentered the detector portion of detector head 506. The A and B axes are orthogonal, so vector 10a can be defined by the addition of A and B vector components ($A_a$ and $B_a$). The orientation of the orthogonal axes are set so that, in the absence of a magnetic field at surface 749, and in the absence of any polarization angle rotation, the magnitudes of the A and B components are equal. The magnitudes of the A and B components of vector 10a are indicated in FIG. 4. Because the magnitude of both the A and B components are equal, vector 10a corresponds to no magnetic field at reflection point 740 on surface 749. Vector 10b corresponds to a slight counter-clockwise rotation of the polarization angle, and the magnitude of vector 10b is larger than the magnitude of vector 10a. This illustrates the effect of common mode amplitude fluctuation. When the A and B components of vector 10b are subtracted, the direction of rotation can be determined. While the magnitude of the difference between the A and B components will change with a common mode amplitude fluctuation, the sign of the difference between the two components will not be affected by amplitude fluctuations.

Figure 5:
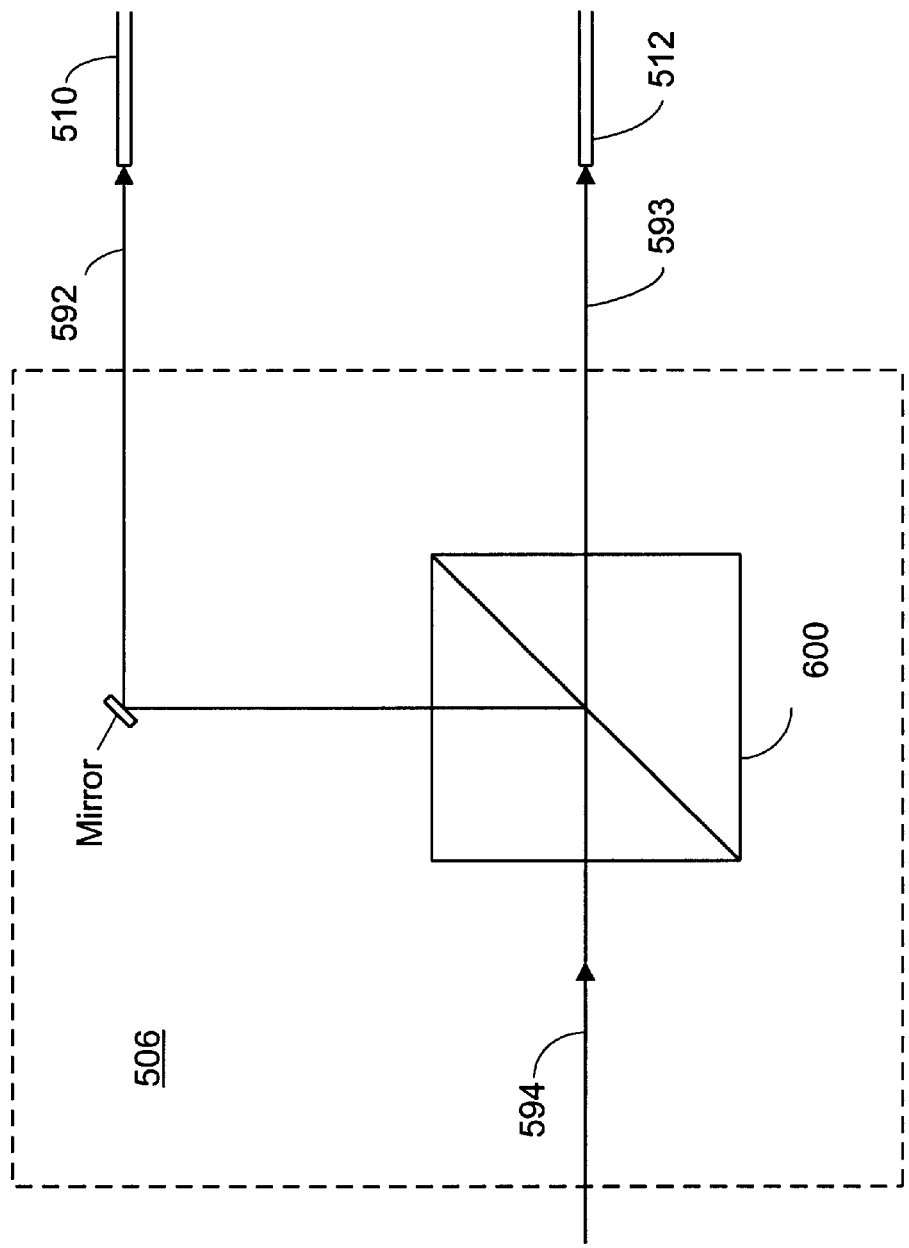
FIG. 5 is an illustration of a polarization beam splitter and photodetectors used to convert a reflected light beam into A and B component signals.

Referring now to FIG. 5, in detector head 506 reflected polarized light beam 594 is routed to polarizing beam splitter 600, which produces two resulting light beams 592 and 593. One resulting light beam contains the A polarization component of the reflected light beam, and the other resulting light beam contains the B polarization component. As illustrated in FIG. 1, light beams 592 and 593 are routed, by fibers 510 and 512, to optics assembly 501, where they are converted into signals 100 and 200. Signals 100 and 200 are routed to a preamplifier, such as preamplifier 60. In a magneto-optical storage device which includes more than one detector head 506, each corresponding to a unique storage surface 749, one set of light beams 592 and 593 are produced for each detector head 506. Each light beam 592 is carried by a corresponding fiber 510, and each light beam 593 is carried by a corresponding fiber 512. In one embodiment, all fibers 510 are bundled together at lens 638, and all fibers 512 are bundled together at lens 639. When information from a different storage surface 749 is read, the corresponding light beams 592 and 593 produce signals 100 and 200, which are passed to preamplifier 60. It will be appreciated that each individual signal path from beam splitters 600, through photodetectors 635 and 636, and into preamplifier 60, will generally have unique optical and electrical properties. The path variations cause repeatable variations in the amplitudes of signals 100 and 200 at preamplifier 60. The result is that, upon arriving at preamplifier 60, either signal 100 or signal 200 should be modified to compensate for the different paths. Without compensating for the different optical and electrical paths, a difference signal based on signal 100 and signal 200 will generally be inaccurate.

Referring now to FIG. 6, in preamplifier 60 current signal 100 is initially passed to transimpedance amplifier 300, and current signal 200 is initially passed to transimpedance amplifier 302. Transimpedance amplifier 300 produces voltage signals 102 and 104 from current signal 100. Signal 102 is proportional to signal 100, and signal 104 is the negative of signal 102. In this embodiment, both signals 102 and 104 are positive with respect to ground. With no input signal applied, output signals 102 and 104 are both equal to a positive DC common mode voltage. As current into input 100 increases, signal 102 rises above the common mode output level, and signal 104 falls below it. The difference between signals 102 and 104 is proportional to the input 100. This proportionality is the gain of transimpedance amplifier 300. Voltage signals 202 and 204 produced by transimpedance amplifier 302 are similarly proportional to signal 200, with signal 204 being the negative of signal 202.

Signals 102 and 104 are passed to multiplier cell 304. In this embodiment, multiplier cell 304 is a standard Gilbert multiplier cell. Signals 102 and 104 constitute one differential input to multiplier 304. The other differential input to multiplier 304 comes from constant voltage source 160. Multiplier 304 is also connected to two current sources 150, and lines 316 and 318. The product of the differential signals from transimpedance amplifier 300 and voltage source 160 determines the level of current flowing from lines 316 and 318 through current sources 150 to ground. The sum of output currents 316 and 318 is always equal to the sum of the two source currents 150. The difference between currents 316 and 318 is proportional to the difference between input voltages 102 and 104. The gain from signals 102 and 104 to currents 316 and 318 is defined by voltage source 160. Because signals 102 and 104 are the signals of interest, the signal from voltage source 160 is referred to herein as the gain for multiplier 304. A multiplier such as multiplier 304 is considered to be a specialized form of amplifier. Current signal 318 changes in a negative sense with regard to current signal 316, although current flows in the same direction for both signals. As with voltage signals 102 and 104, there is a positive DC offset current for current signals 316 and 318.

Multiplier cell 306 operates in the same manner as multiplier 304. Multiplier 306 accepts voltage signals 202 and 204 and produces current signals 320 and 322, where signal 320 is proportional to an amplified version of 202, and signal 322 is proportional to an amplified version of 204. Unlike multiplier 304, however, the value by which multiplier 306 multiplies differential signals 202 and 204 to create signals 320 and 322 is not fixed. Rather, the value is set through digital to analog converter (DAC) 308. By changing a digital compensation value input to DAC 308, the gain of multiplier 306 can be varied above and below that of multiplier 304. In one embodiment, DAC 308 is able to set the gain of multiplier 306 over a range of 35% below the gain of multiplier 304 to 35% above the gain of multiplier 304. In other embodiments this range can be larger or smaller.

DAC 308 changes the gain of amplifier 306 to compensate for the differences between the optical and electrical paths of signal 100 and signal 200. If there were no differences in these paths, then no compensation would be necessary, and in that case DAC 308 should be set to cause multiplier 306 to have the same gain as multiplier 304. When DAC 308 is set to properly compensate for path differences, the resulting current signals 316, 318, 320, and 322 are directly comparable.

Current signals 316 and 322 are added directly to get current signal 332, and current signals 318 and 320 are added to get current signal 334. Because signal 316 is proportional to signal 100, and signal 322 is proportional to the negative of signal 200, signal 332 is proportional to signal 100 minus signal 200. Because signal 318 is proportional to the negative of signal 100, and signal 320 is proportional to signal 200, signal 334 is proportional to signal 200 minus signal 100. Current signals 332 and 334 are converted to voltage signals 336 and 338, respectively, through resistors 350 and 352 which are connected to constant supply voltage 360. Voltage signals 336 and 338 are input to the non-inverting and inverting inputs, respectively, of difference amplifier 312. Signal 400 is output from amplifier 312 and is proportional to the difference of signal 100 minus compensated signal 200. Signal 402 is also output from amplifier 312, and is proportional to the difference of compensated signal 200 minus signal 100. Signals 400 and 402 are output from preamplifier 60, and indicate the direction of angular rotation 763 of the polarization present in light beam 594 reflected from magneto-optical storage surface 749. The output of a comparator operating on these two signals can indicate the state of the data stored on magneto-optical storage surface 749.

In the embodiment described, signals 332 and 334 are produced by directly adding together currents. By adding currents, rather than voltages, a more accurate result is obtained over a wider bandwidth, with better rejection of the common-mode signal.

When DAC 308 properly compensates for the path differences of signals 100 and 200, both output data signals 400 and 402 carry difference information from signals 100 and 200. This difference information corresponds directly to the direction of magnetic fields on magneto-optical storage surfaces 749 which represent the data stored on the surfaces. Signals 400 and 402 are used by magneto-optical device 500 as data signals.

In order for DAC 308 to properly compensate for path differences, it must have the correct digital compensation value fed to it. In most cases, the effects of path differences are due to properties of the optical and electrical mechanisms, and do not change significantly over time. For this reason, only a single digital compensation value is necessary for each detector head 506 in magneto-optical device 500. In one embodiment, this value is determined for each head 506 in the system, and the values are stored in long-term memory, possibly on magneto-optical surface 749 itself. Alternately, the values can be determined at each power-up of magneto-optical device 500, with the values stored in volatile memory. When a new detector head 506 is activated, the compensation value associated with that head 506 is retrieved from storage, and is loaded into DAC 308. In the embodiment described, the compensation value is retrieved the same drive firmware which coordinates the switching of active heads 506.

Whether it is performed every time magneto-optical storage device 500 is powered up, or just once in the initial calibration of the system, it is necessary to determine the correct digital compensation value for each detector head 506. In one embodiment, the compensation values are calculated by monitoring data signals 400 and 402 at a time when signals 100 and 200 should be the same. When signals 100 and 200 are the same, the difference of data signal 400 minus data signal 402 should be zero. For each detector head 506, a known modulation signal is applied to the laser power level while laser beam 591 is reflected off spot 740 on a portion of surface 749 where no magneto-optical data is present. Signals 100 and 200 should be identical, since they carry no data. DAC 308 is stepped over a range of values, to determine which value minimizes the feedthrough of the known modulation signal to signals 400 and 402. This digital value is then stored for later use in conjunction with that detector head 506. The same process is repeated for all of the detector heads 506, generating a lookup table of compensation values to be used in correcting for the optical and electrical differences in each path.

The above description is included to illustrate the operation of exemplary embodiments and is not meant to limit the scope of the invention. The scope of the invention is to be limited only by the following claims. From the above description, many variations will be apparent to one skilled in the art that would be encompassed by the spirit and scope of the present invention. For example, it is contemplated that in some embodiments of the invention the gain of both multipliers 304 and 306 are variable. Also, it is understood that a variety of different types of amplifiers can be used in place of multipliers 304 and 306.

I claim:

1. A method for determining a difference signal from a first data signal and a second data signal in a magneto optical data storage system, the first data signal and the second data signal each being based on polarization characteristics of a light beam after the light beam has been reflected off a magneto optical surface, the method comprising:

receiving a digital to analog converter (DAC) gain value;

modifying the first data signal with the digital to analog converter gain value to produce a first modified data signal;

modifying the second data signal with a second gain to produce a second modified data signal; and generating a difference signal that is based on the differences between the first modified data signal and the second modified data signal, wherein the difference signal can be modified by varying the digital to analog converter gain value to at least partially compensate for a signal variation introduced by differences between properties of a transmission path of the first data signal and properties of a transmission path of the second data signal.

2. The method of claim 1, further comprising the step of:

adjusting the second gain to at least partially compensate for the signal variation.

3. The method of claim 1, wherein the signal variation is at least partially due to differences between the optical properties of the transmission path of the first data signal and the optical properties of the transmission path of the second data signal.

4. The method of claim 1, wherein the signal variation is at least partially due to differences between the electrical properties of the transmission path of the first data signal and the electrical properties of the transmission path of the second data signal.

5. The method of claim 1, wherein the step of generating a difference signal comprises additively combining current signals.

6. The method of claim 5, wherein the signal variation is at least partially due to differences between the optical properties of the transmission path of the first data signal and the optical properties of the transmission path of the second data signal.

7. The method of claim 5, wherein the signal variation is at least partially due to differences between the electrical properties of the transmission path of the first data signal and the electrical properties of the transmission path of the second data signal.

8. The method of claim 1, wherein the light beam is received by an active detector head after the light beam has reflected off one of a plurality of magneto optical surfaces, which active detector head is one of a plurality of detector heads, and the properties of the transmission path of the first signal are dependent upon which detector head is the active detector head.

9. The method of claim 8, wherein the step of adjusting the digital to analog converter (DAC) gain comprises the sub-step of adjusting the digital to analog converter (DAC) gain based on one of a plurality of digital gain correction factors, each digital gain correction factor being associated with one of the plurality of detector heads.

10. The method of claim 9, wherein the step of adjusting the first digital to analog converter (DAC) gain based on one of the plurality of digital gain correction factors comprises the sub-steps of:

retrieving the digital gain correction factor which is associated with the active detector head; and feeding the retrieved digital gain correction factor to the digital to analog converter (DAC).

11. The method of claim 10, wherein the sub-step of retrieving the digital gain correction factor which is associated with the active detector head comprises the sub-step of reading a digital gain correction factor out of a digital memory storage location associated with the active head, which digital memory storage location is one of a plurality of digital memory storage locations.

12. The method of claim 11, further comprising the steps of:

determining a digital gain correction factor for each detector head; and for each digital gain correction factor determined, initializing one of the digital memory storage locations with the digital gain correction factor.

13. The method of claim 12, wherein the step of determining a digital gain correction factor for each head comprises the sub-steps of:

while the light beam is being reflected off a portion of a magneto optical surface without magneto optical data:

modulating the light beam with a known modulation signal;

setting the DAC to more than one DAC value;

for each DAC value, measuring the magnitude of the known modulation signal in the difference signal; and setting the DAC value corresponding to the lowest of measured magnitude as the digital gain correction factor.

14. The method of claim 12, wherein at least one of the digital memory storage locations is a portion of a magneto optical surface.

15. A differencing apparatus for determining a difference signal from a first data signal and a second data signal, the first data signal and the second data signal each being based on polarization characteristics of a reflected light beam in a magneto optical data storage system, the differencing apparatus comprising:

a first amplifier module for accepting the first data signal, amplifying the first data signal by a first gain, and producing a first modified data signal therefrom;

a digitally adjustable gain module coupled to the first amplifier for setting the first gain by accepting a digital gain correction factor;

a summing module coupled to the first amplifier, for accepting the first modified data signal and a second modified data signal, and producing the difference signal therefrom, wherein the difference signal can be modified by varying the digital gain correction factor to at least partially compensate for a signal variation introduced by differences between properties of a transmission path of the first data signal and properties of a transmission path of the second data signal; and an inverting module coupled to the summing module, for accepting the second data signal, inverting the second data signal, and producing the second modified data signal based thereon.

16. The differencing apparatus of claim 15, wherein the signal variation is at least partially due to differences between the optical properties of the transmission path of the first data signal and the optical properties of the transmission path of the second data signal.

17. The differencing apparatus of claim 15, wherein the signal variation is at least partially due to differences between the electrical properties of the transmission path of the first data signal and the electrical properties of the transmission path of the second data signal.

18. The differencing apparatus of claim 15, wherein the summing module accepts the first modified data signal and the second modified data signal in the form of current signals, and produces the difference signal on an output line by connecting the first modified data signal and the second modified data signal directly to the output line.

19. The differencing apparatus of claim 15, wherein the digitally adjustable gain module comprises a digital to analog converter (DAC) which accepts the digital gain correction factor.

20. A magneto optical storage device, comprising:

an active detector head for receiving a light beam after the light beam has been reflected off an associated magneto optical storage surface, and for producing a first data signal and a second data signal based on polarization characteristics of the light beam, which active detector head is one of a plurality of detector heads;

a first amplifier module coupled to the active detector head by a first data signal path, for accepting the first data signal from the active detector head via the first data signal path, amplifying the first data signal by a first gain, and producing a first modified data signal therefrom;

a digital to analog converter (DAC) coupled to the first amplifier for setting the first gain by accepting a digital gain correction factor;

a summing module coupled to the first amplifier, for accepting the first modified data signal and a second modified data signal, and producing the difference signal therefrom, wherein the difference signal can be modified by varying the digital gain correction factor to at least partially compensate for a signal variation introduced by differences between properties of a transmission path of the first data signal and properties of a transmission path of the second data signal; and an inverting module coupled to the summing module and coupled to the active detector head by the second data signal path, for accepting the second data signal via the second data signal path, inverting the second data signal, and producing the second modified data signal based thereon.

21. The magneto optical storage device of claim 20, further comprising a plurality of digital memory storage locations coupled to the DAC, for storing a plurality of digital gain correction factors.

22. A preamplifier for a data storage system, wherein the preamplifier determines a difference signal from a first data signal and a second data signal, comprising:

a first amplifier module for accepting the first data signal;

a second amplifier module for accepting the second data signal;

a gain module coupled to the first amplifier, wherein the gain module determines a gain for the first amplifier, and wherein the first amplifier generates a modified first data signal based on the gain determined by the gain module;

a digital to analog converter coupled to the second amplifier, wherein a digital gain correction factor is input into the digital to analog converter to adjust the gain on the second amplifier to generate a modified second data signal; and a summing module coupled to the first and second amplifiers, wherein the summing module receives the modified first data signal and the modified second data signal and generates a difference signal therefrom, wherein the difference signal can be modified by varying the digital gain correction factor input into the digital to analog converter to at least partially compensate for any signal variations in the first and second data signals.

23. The preamplifier of claim 22, wherein the gain module comprises a constant voltage source.

24. The preamplifier of claim 23, wherein the digital to analog converter is coupled to a memory having a plurality of storage locations, wherein a different digital gain correction factor is stored in each one of the plurality of storage locations, and wherein a particular digital gain correction factor is automatically read from its corresponding storage location and input into the digital to analog converter when a particular detector head is activated.

* * * * *